United States Patent [19]
Amada et al.

[11] Patent Number: 5,465,180
[45] Date of Patent: Nov. 7, 1995

[54] METHOD OF AND APPARATUS FOR RECORDING AND/OR REPRODUCING A CURRENT DIGITAL VIDEO SIGNAL AND A HIGH-DEFINITION DIGITAL VIDEO SIGNAL IN A COMMON TRACK FORMAT

[75] Inventors: Nobutaka Amada; Takaharu Noguchi, both of Yokohama, Japan

[73] Assignee: Hitachi, Ltd., Tokyo, Japan

[21] Appl. No.: 79,868

[22] Filed: Jun. 23, 1993

[30] Foreign Application Priority Data

Jun. 29, 1992 [JP] Japan .................................. 4-170456

[51] Int. Cl.$^6$ .................................................. H04N 5/782
[52] U.S. Cl. ............................................ 360/19.1; 358/343
[58] Field of Search .................... 360/19.1, 64; 358/343, 358/341

[56] References Cited

U.S. PATENT DOCUMENTS

| | | | |
|---|---|---|---|
| 4,947,271 | 8/1990 | Nakayama et al. | 360/19.1 |
| 5,063,453 | 11/1991 | Yoshimura et al. | 360/32 |
| 5,065,259 | 11/1991 | Kubota et al. | 360/19.1 X |

FOREIGN PATENT DOCUMENTS

| | | |
|---|---|---|
| 3819393 | 6/1988 | Germany . |
| 3918454 | 6/1989 | Germany . |
| 04238164 | 8/1992 | Japan . |

OTHER PUBLICATIONS

Patent Abstracts of Japan, vol. 14, No. 104, (P1013), Feb. 26, 1990, & JP1-307977.
Patent Abstracts of Japan, vol. 14, No. 116, (P1016), Mar. 5, 1990, & JP1-312781.
Patent Abstracts of Japan, vol. 14, No. 175, (E0914), Apr. 6, 1990, & JP2-29174.

*Primary Examiner*—W. R. Young
*Attorney, Agent, or Firm*—Antonelli, Terry, Stout & Kraus

[57] ABSTRACT

A digital magnetic recording method, recording apparatus, reproducing apparatus, and recording/reproducing apparatus for recording and/or reproducing a current digital video signal and a high-definition (HD) digital video signal in a common track format on a recording tape using rotary heads. In recording, the current digital video signal is compressed to a specified amount of data, the HD digital video signal is compressed to n (n is an integer of 2 or larger) times the amount of data of the compressed current digital video signal, and when recording the current digital video signal, digital audio signals of m (m is an integer of 2 or larger) channels are multiplexed with the current digital video signal in time division, and the multiplexed signal is azimuth-recorded with k (k is an integer of 2 or larger) magnetic heads on k tracks in every one revolution of the rotary drum, and when recording digital audio signals of n×m channels are multiplexed with the HD digital video signal in time division, the transportation speed of the magnetic tape is made n times the tape transportation speed in recording the current digital video signal, and the multiplexed signal is recorded by azimuth recording with n×k magnetic heads on n×k tracks in every one revolution of said rotary drum.

14 Claims, 7 Drawing Sheets

METHOD OF AND APPARATUS FOR RECORDING AND/OR REPRODUCING A CURRENT DIGITAL VIDEO SIGNAL AND A HIGH-DEFINITION DIGITAL VIDEO SIGNAL IN A COMMON TRACK FORMAT

BACKGROUND OF THE INVENTION

The present invention relates to a rotary head type helical scanning system digital magnetic recording method, recording apparatus, reproducing apparatus, and recording/reproducing apparatus. More particularly, the invention concerns a digital recording method, recording apparatus, reproducing apparatus, and recording/reproducing apparatus, which have a track format suitable for selectively recording and/or reproducing either of two kinds of digital video signals including different amounts of information.

To show a set of two digital video signals with different amounts of information, one is a digital video signal of the 525-line/60-field system or the 625-line/50-field system (hereafter referred to as the current digital video signal), and the other is a high definition (HD) digital video signal of the 1125-line/60-field system (hereafter referred to as the HD digital video signal).

At present, as recording apparatus of the current digital video signal, so-called D1-VTR, D2-VTR, etc. arrangements have been put into practical business use. With regard to the D1 format for the D1-VTR and the D2 format for the D2-VTR, description has been made in "Television Gakkai-Shi" (the Journal of the Institute of Television Engineers of Japan), Vol. 42, No. 4 (April, 1988), pp. 338–346. As regards the recording apparatus of the HD digital video signal, a digital VTR using a one-inch tape has been used for business purposes. However, a digital VTR has not been created which can record and reproduce both the current digital video signal and the HD digital video signal as a single compatible apparatus.

When an assumption is made that a home-use digital VTR is produced which is compatible with high definition television (HDTV) broadcasting expected to come into a full-fledged operation in the near future, it is naturally desired that the digital VTR can record and reproduce both the current digital video signal and the HD digital video signal with a common cassette tape and a common scanner (drum and heads). Further, as it is produced for home use, the VTR should be a less expensive system. To this end, it is necessary to reduce the bit rate of the digital video signal to thereby decrease the recording data rate and the amount of tape used and reduce the size of the tape cassette.

An apparatus for recording the digital video signal with DCT-based bit-rate reduction has been discussed by Borger et al. in "An Experimental Digital VCR with 40 MM Drum, Single Actuator and DCT-Based Bit-Rate Reduction" in IEEE Transactions on Consumer Electronics, Vol. 34, No. 3, August, 1988, pp. 597–605.

However, in the above-mentioned prior art, no consideration has been made about the compression ratio between the current digital video signal and the HD (high definition) digital video signal, that is to say, about the ratio of the recording data rate between the current digital video signal and the HD digital digital video signal after the bit-rate reduction. Nor has consideration has been made about the multiplexing of the digital video signal with the digital audio signal and the compatibility of the track format. U.S. Pat. No. 4,617,599 assigned to the assignee of the present invention discloses a PCM signal recording/reproducing apparatus which keeps constant the recording format on a recording medium by varying the number of drum revolutions and also the tape speed according to the sampling frequency of the audio signal.

SUMMARY OF THE INVENTION

It is therefore an object of the present invention to provide a digital magnetic recording method, recording apparatus, reproducing apparatus, and recording/reproducing apparatus, which have solved the problems not considered in the above-mentioned prior art and which are capable of recording and/or reproducing the current digital video signal and the HD digital video signal in a common track format.

Another object of the present invention is to provide a digital recording/reproducing apparatus capable of recording and reproducing the video signals of the above-mentioned different systems by a small-size low-priced mechanism.

In digital recording according to an aspect of the present invention, the current digital video signal is compressed to a specified amount of data, the HD digital video signal is compressed to n (n is an integer of 2 or larger) times as large as the data amount of the current digital video signal which has been compressed, and when the current digital video signal is recorded, the compressed current digital video signal is multiplexed in time division with digital audio signals from m (m is an integer of 2 or larger) channels, the signals thus multiplexed in time division are recorded by azimuth recording with k (k is an integer of 2 or larger) magnetic heads on k tracks in every one revolution of the rotary drum, and when the HD digital video signal is recorded, the compressed HD digital video signal is multiplexed in time division with the digital audio signals from n×m channels, the transportation speed of the magnetic tape is increased to n times that in recording the current digital video signal, and the signals multiplexed in time division are recorded by azimuth recording with n×k magnetic heads on n×k tracks in every one revolution of the rotary head.

In digital recording according to another aspect of the present invention, when the current digital video signal is recorded, like in the above-mentioned aspect of the invention, the current digital video signal compressed is multiplexed in time division with the digital audio signals from m channels, the signals multiplexed in time division are recorded by azimuth recording with k magnetic heads on k tracks in every one revolution of the rotary drum, and when the HD digital video signal is recorded, the compressed HD digital video signal is multiplexed in time division with the digital audio signals from n×m channels, the transportation speed of the magnetic tape and the number of drum revolutions are increased to n times that in recording the current digital video signal, and the signals multiplexed in time division are recorded with k magnetic heads on k tracks in every one revolution of the rotary drum.

By the above arrangement, the ratio of the total amount of recorded information in the video signal multiplexed with the audio signals between the current system and the HD system is 1:n, which is the same ratio as that of amount of video signal information between the different TV systems, and since the ratio of the numbers of magnetic heads or the number of drum revolutions is 1:n, too, the amount of information recorded per track can be made constant. Therefore, it is possible to use a common track format, including the recording areas of the video signal and the audio signal, for both the current digital video signal and the HD digital video signal. In addition, since the transportation speed of the magnetic tape is also 1:n, the same track pitch can be used compatibly.

BRIEF DESCRIPTION OF THE DRAWINGS

The same component parts and elements in the figures are designated by the same reference numerals.

DESCRIPTION OF THE PREFERRED EMBODIMENTS

Embodiments of the present invention will be described in detail with reference to the accompanying drawings.

Figure 1:
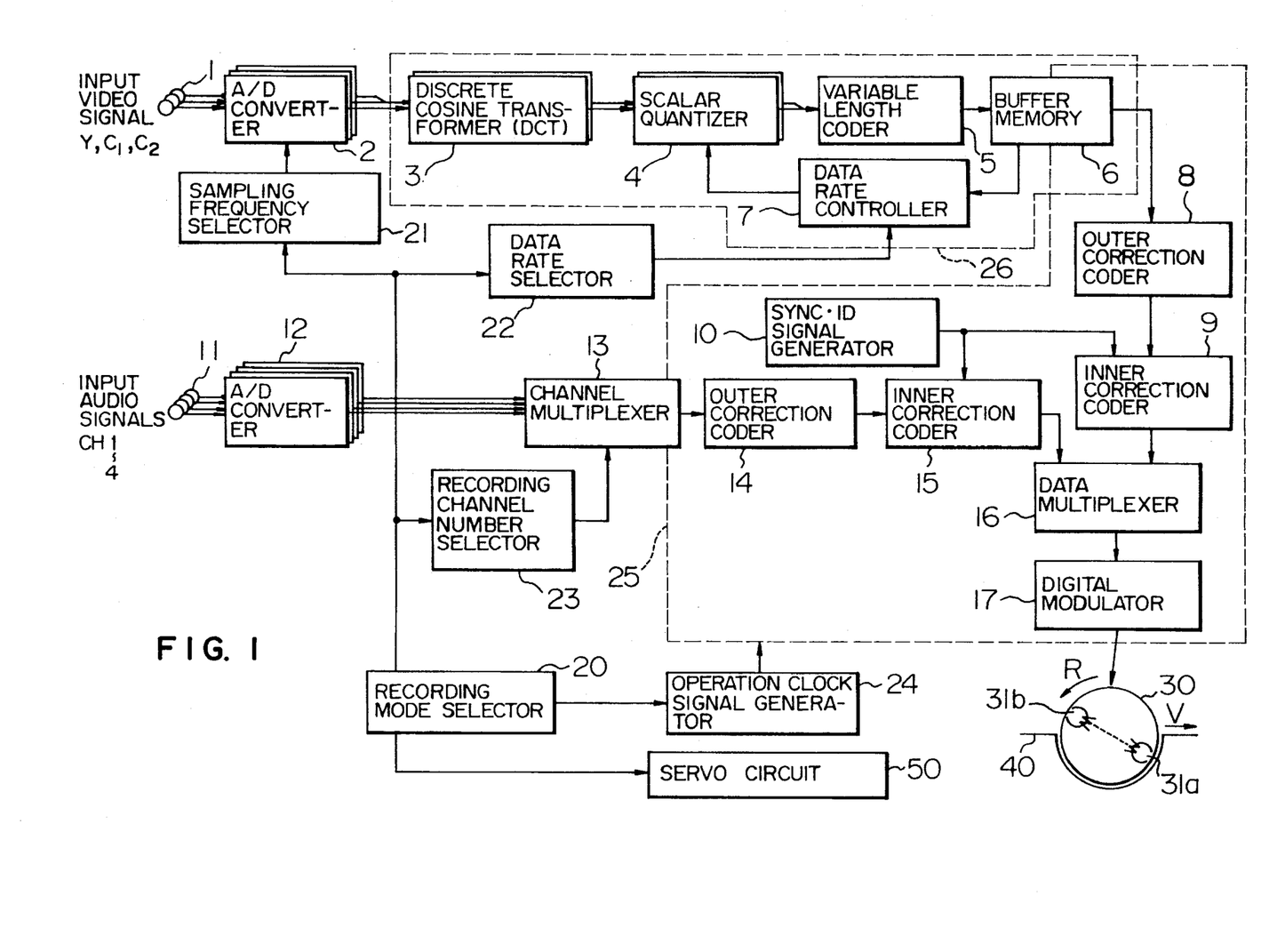
FIG. 1 is a block diagram showing an embodiment of the digital magnetic recording apparatus according to the present invention.

FIG. 1 shows in a block diagram an embodiment of the digital magnetic recording apparatus according to the present invention. In FIG. 1, reference numeral 1 denotes input terminals of the current TV system video component signals or the HDTV system video component signals, 2 denotes analog-to-digital (A/D) converters for the video component signals, 3 denotes discrete cosine transformers (DCT), 4 denotes a scalar quantizer, 5 denotes a variable length coder, 6 denotes a buffer memory, 7 denotes a data rate controller, 8 denotes an outer correction coder, 9 denotes an inner correction coder. Further, 10 denotes a synchronization signal and identify data (sync and ID) generator, 11 denotes input terminals for audio signals from a plurality of channels, 12 denotes A/D converters for the audio signals, 13 denotes a multiplexer, 14 denotes an outer correction coder, 15 denotes an inner correction coder, 16 denotes a data multiplexer, and 17 denotes a digital modulator. Further, 20 denotes a recording mode setter for setting the recording mode for the current TV system or HDTV system video signal, 21 denotes a sampling frequency (Fs) selector for changing over the sampling frequency of the A/D converter according to the recording mode of the current TV or HDTV system video signal, 22 denotes a data-rate selector for changing over the recording data rate according to the recording mode of the current TV system or HDTV system video signal, and 23 denotes a recording channel number selector for changing over the number of recording channels of the audio signals according to the recording mode of the current TV system or HDTV system video signal. In addition, 24 denotes an operation clock signal generator, 25 denotes a digital record processing circuit, 30 denotes a rotary drum, 31a and 31b denote magnetic heads, 40 denotes a magnetic tape, and 50 denotes a servo circuit. The operation of the above-mentioned circuits is described in the following.

In FIG. 1, a video signal, including a luminance signal (Y) and two baseband color signals ($C_1$, $C_2$) of the current TV system or the HDTV system, is input through the video component signal input terminals 1, and this analog video signal is converted by the A/D converters 2, which process the three component video signals into the current digital video signal or the HD digital video signal. The current or HD digital video signal is subjected to discrete cosine transformation by discrete cosine transformers 3, then quantized by scalar quantizers 4 and undergo variable length coding by a variable length coder 5, and the digital video signal compressed in terms of data rate is input to a buffer memory 6. Subsequently, a data rate controller 7, which controls the data rate of the video signal under its control on the basis of the data rate set by a data rate selector 22, controls a quantization table of the scalar quantizer 4 so that the compressed data amount does not exceed a specified memory capacity, and data to be recorded is output at a fixed rate from a buffer memory 6.

On the other hand, audio signals of four channels from channel 1 (ch1) to channel 4 (ch4) are input from audio signal input terminals 11, converted by A/D converters 12 into digital audio signals, and the four-channel digital audio signals are multiplexed together in time division by a channel multiplexer 13.

The compressed digital video signal and the digital audio signal are each added with an error correction code of the first stage by the outer correction coders 8 and 14 and also added with a sync signal and an ID signal by the sync and ID signal generator 10, and further each added with an error correction code of the second stage by the inner correction coders 9 and 15. Those operations are called the formatting process. The signals thus formatted are multiplexed together in time division by the data multiplexer 16. The time-division multiplexed digital video signal and digital audio signal are modulated by the modulator 17 into record codes suitable for magnetic recording, and are recorded on the magnetic tape 40 with the magnetic heads 31a and 31b mounted at 180° opposite positions of the rotary drum 30. The servo circuit 50 controls the rotating speed of the rotary drum 30 and the transportation speed of the magnetic tape 40.

This embodiment features the steps of setting the recording data rate of the compressed HDTV system video signal to n (n is an integer of n or larger) times as large as the recording data rate of the current TV system video signal which has been compressed, and similarly setting the number of channels of audio signals to be recorded when recording the HDTV system video signal to n times as large as the number of channels of audio signals to be recorded when recording the current TV system video signal. Note that the n is 2 in this embodiment shown in FIG. 1. For simplicity of description, the operation in the case of n=2 will be described in the following.

The recording mode setter 20 selects the recording mode of the current TV system video signal or the HDTV system video signal. In compliance with this recording mode, the sampling frequency selector 21 changes over the sampling frequency of the A/D converters 2 to a sampling frequency corresponding to the current or HDTV system video signal. Likewise, in compliance with the recording mode, the data rate selector 22 controls the compression ratio of the current or HDTV system video signal, and changes over the ratio of the recording data rate after compression so as to be 1:2 between the current system and HDTV system video signals. The recording channel number selector 23 controls the channel multiplexer 13 according to the recording mode, and changes over the number of channels of audio signals multiplexed in the ratio of 1:2, the same as in the recording data rate after the video signal has been compressed, to give an example, 2 channels for recording the current TV system video signal and 4 channels for recording the HDTV system video signal. The operation clock signal generator 24 generates operation clock signal of the code record processing circuit 25, and the clock signal frequency is controlled so as to be in the ratio of 1:2 to comply with the recording modes mentioned above. Therefore, the ratio of the final recording data rates also becomes 1:2 between the current TV system and the HDTV system video signals in recording.

Another feature of this embodiment is that a common track pattern, including the recording areas of the video signal and the audio signal, is used for recording the current TV system and the HDTV system video signals.

Figure 2A:
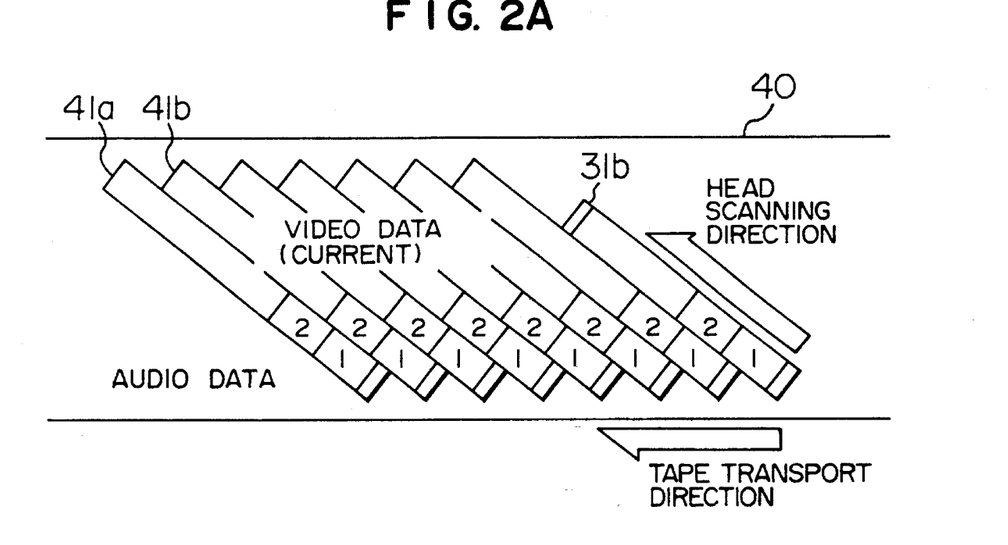
FIGS. 2A and 2B are diagrams showing track patterns for the current video data and the HD video data in an embodiment of the digital magnetic recording method according to the present invention, respectively.
Figure 2B:
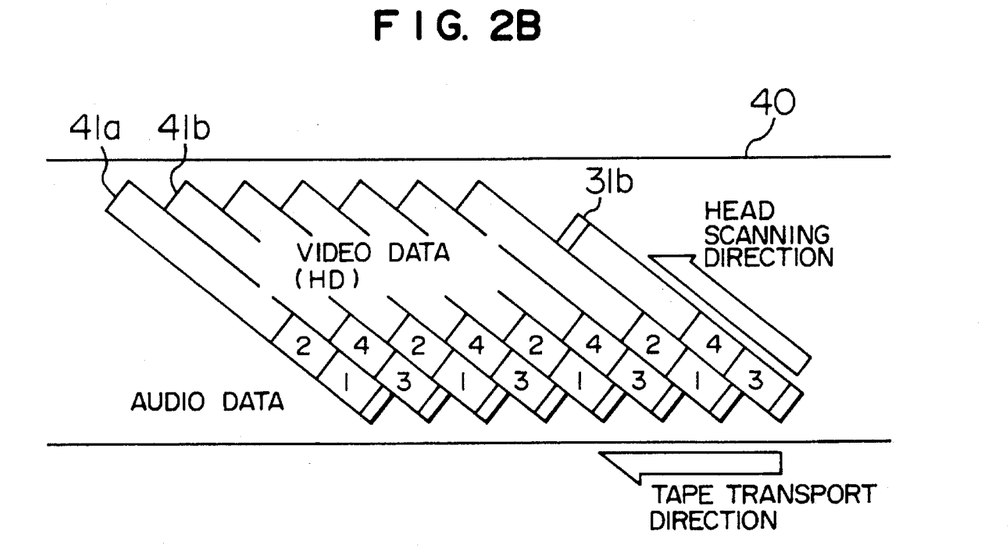

FIGS. 2A and 2B show examples of the track patterns in this embodiment. FIG. 2A depicts the track pattern when recording the current TV system video signal, while FIG. 2B depicts the track pattern when recording the HDTV system video signal. When recording the current TV system video signal shown in FIG. 2A, a signal output from the digital modulator 17 is recorded on tracks 41*a* and 41*b* on the magnetic tape 40 respectively with the magnetic heads 31*a* and 31*b* positioned 180° opposite to each other. Here, the track pitch is set at 10µ, for example. The numerals in the audio data denote the channel numbers of the audio signal. To give an example, the audio signals from two channels are recorded in the divided areas. When recording the HDTV system video signal, as mentioned earlier, the recording data rate is twice as high as that of the current TV system video signal, and therefore, the servo circuit 50 controls the rotating speed of the rotary drum 30 and the transportation speed of the magnetic tape 40 to make those speeds twice as high as in recording the current TV system video signal. So, as shown in the track pattern in FIG. 2B, the audio signals of channels 1 and 2 are recorded on the track 41*a*, while the audio signals of channels 3 and 4 on the track 41*b*.

Figure 3:
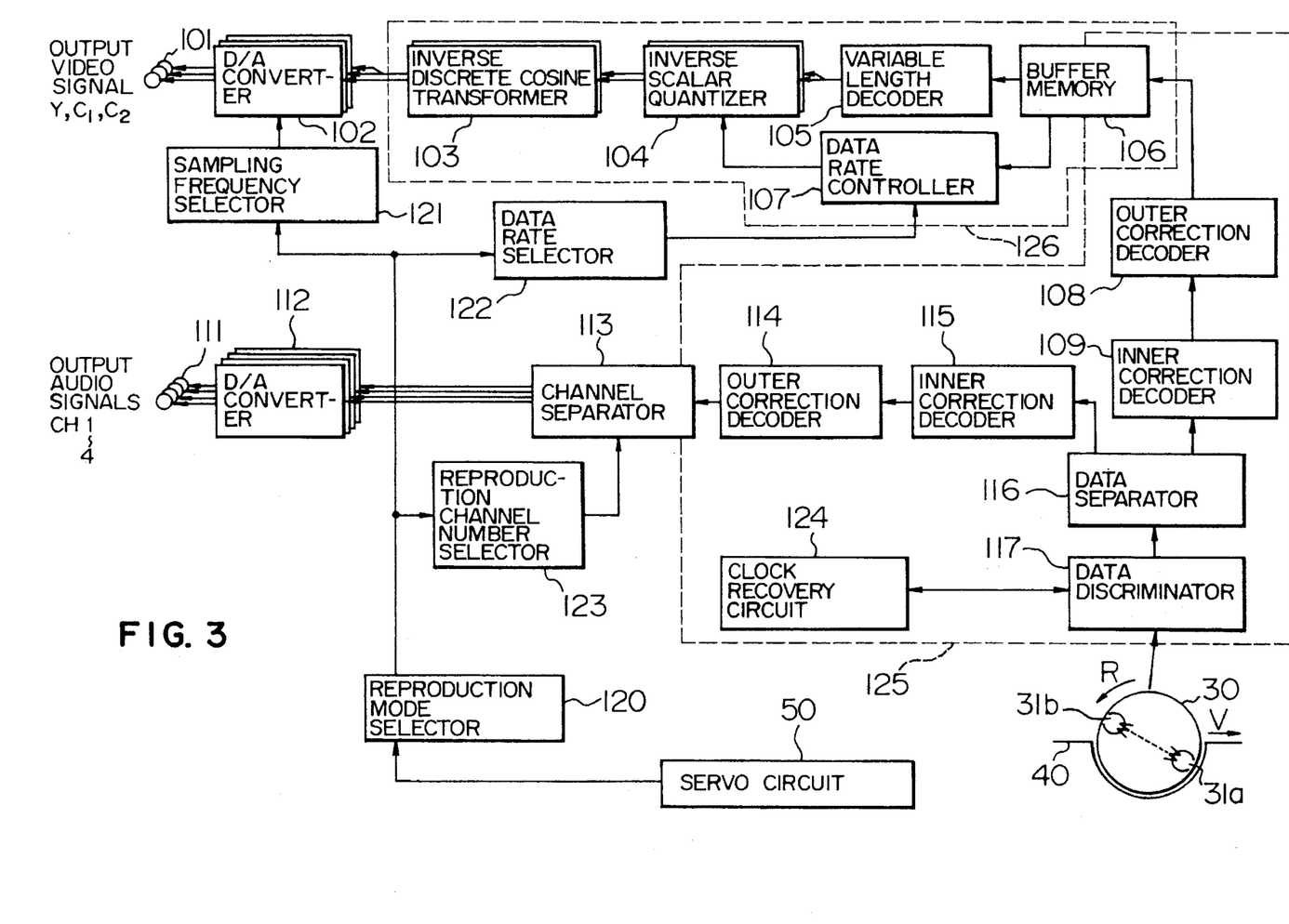
FIG. 3 is a block diagram showing an embodiment of the digital magnetic reproducing apparatus according to the present invention.

FIG. 3 is a circuit block diagram of an embodiment of the digital magnetic reproducing apparatus according to the present invention. In FIG. 3, reference numeral 101 denotes D/A converters, 103 denotes inverse discrete cosine transformers, 104 denotes inverse scalar quantizers, 105 denotes a variable length decoder, 106 denotes a buffer memory, and 107 denotes a data rate controller. In addition, 108 denotes an outer correction decoder, 109 denotes an inner correction decoder, 111 denotes audio signal output terminals, 112 denotes D/A converters, 113 denotes a channel separator, 114 denotes an outer correction decoder, 115 denotes an inner correction decoder, 116 denotes a data separator, and 117 denotes a data discriminator. Reference numeral 120 denotes a reproduction mode selector for setting the reproduction mode of the current TV system or HDTV system video signal, 121 denotes a sampling frequency selector for changing over the sampling frequency of the D/A converter 102 in compliance with the reproduction mode of the current or HDTV system video signal, 122 denotes a data rate selector for changing over the data rate in compliance with the reproduction mode of the current or HDTV system video signal, 123 denotes a reproduction channel number selector for changing over the channel number of the audio signals in compliance with the reproduction mode of the current or HDTV system video signal, 124 denotes a clock recovery circuit, and 125 denotes a reproduction decoding process circuit.

The flow of the signal is in a direction opposite to the direction in recording. Therefore, the signals reproduced with the magnetic heads 31*a* and 32*b* are discriminated by the data discriminator 117, and demodulated, and the video signal and the audio signal are separated by the data separator 116, and the separated video signal and audio signal are subjected to an error correction process of the first stage respectively by the inner correction decoders 109 and 115, and also undergo an error correction process of the second stage by the outer correction decoders 108 and 114. Those operations are referred to the deformatting process. The clock recovery circuit 124 is located behind the data discriminator 117, and recovers the operation clock signal for the component circuits of this reproduction decoding process circuit 125. The error-corrected compressed video signal is passed through the buffer memory 106, the variable length decoder 105, the inverse scalar quantizers 104, and the inverse discrete cosine transformers 103, by which steps the signal is expanded to digital video signal, and the digital video signal is converted by the D/A converters into an analog video signal and output from the video signal output terminals 101.

On the other hand, the error-corrected reproduced audio signal is separated by the channel separator 113 to audio signals of the separate channels, and converted by the D/A converters 112 into analog signals and output from the audio signal output terminals 111.

At this time, in compliance with the reproduction mode detected from the recording tape by the servo circuit 50, the setter 120 for selecting the reproduction mode automatically sets the reproduction mode of the current TV system or HDTV system video signal, and in compliance with the set reproduction mode, the data rate selector 122 controls the expansion ratio so as to reproduce the original current or HDTV system video signal, and in compliance with this reproduction mode, the sampling frequency selector 121 changes over the sampling frequency of the D/A converters 102 to the sampling frequency corresponding to the current or HDTV system video signal. Similarly in compliance with the reproduction mode, the reproduction audio channel number selector 123 changes over the number of channels for reproducing the audio signals to two channels when reproducing the current TV system video signal or four channels when reproducing the HDTV system video signal.

As has been described, according to an aspect of the present invention, by setting the ratio of the numbers of channels of recording the audio signals at the same ratio (1:n in this case) as the ratio of the amounts of data recorded between the current TV system and the HDTV system video signals, and also setting the same ratio for the two video signals as the ratio of the rotating speed of the rotary drum 30 to the transportation speed of the magnetic tape 40, the amount of information recorded per track can be made constant by using the tracks having the same track pitch, so that a common track format, including the recording areas for the video signal and the audio signal, can be used for both the current TV system and the HDTV system.

Incidentally, in FIGS. 1, 2 and 3, the rotating speed of the rotary drum 30 in recording and reproducing the HDTV system video signal is twice as high as that in recording and reproducing the current TV system video signal, but the present invention is not limited to this ratio, and the rotary drum speeds in handling these two video signals may be in any ratio so long as a common track pattern, including the recording areas, is used. To take an example, the drum speed may be the same while twice as many magnetic heads are used for the HDTV system video signal.

Figure 4:
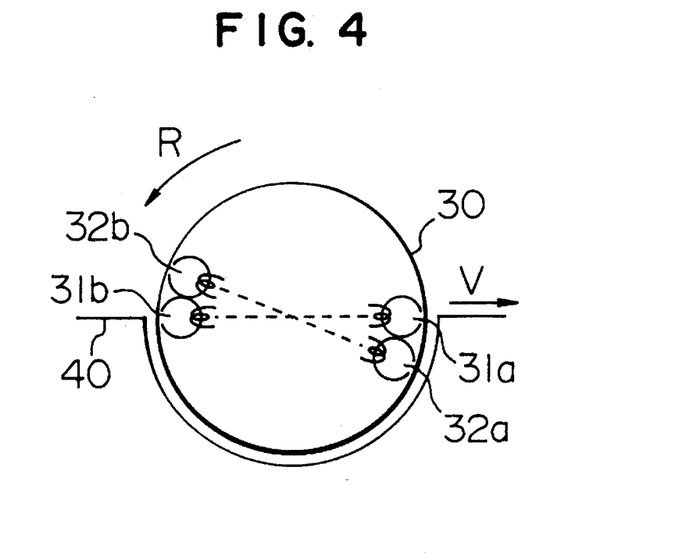
FIG. 4 is a head arrangement diagram in an embodiment of the digital magnetic recording and/or reproducing apparatus according to the present invention.

FIG. 4 shows a head arrangement in an embodiment of the digital magnetic recording and/or reproducing apparatus according to the present invention. In FIG. 4, two couples of magnetic heads 31a, 32a, and 31b, 32b respectively constitute two double-azimuth heads with + and − azimuth angles, and the two heads of each couple are mounted at positions close to each other. In the case of the current TV system video signal, single(1)-channel recording and reproduction is performed with the magnetic heads 31a and 32b, while in the case of the HDTV system video signal, multi(2)-channel recording and reproduction is performed with the magnetic heads 31a, 32a and 31b, 32b.

Figure 5A:
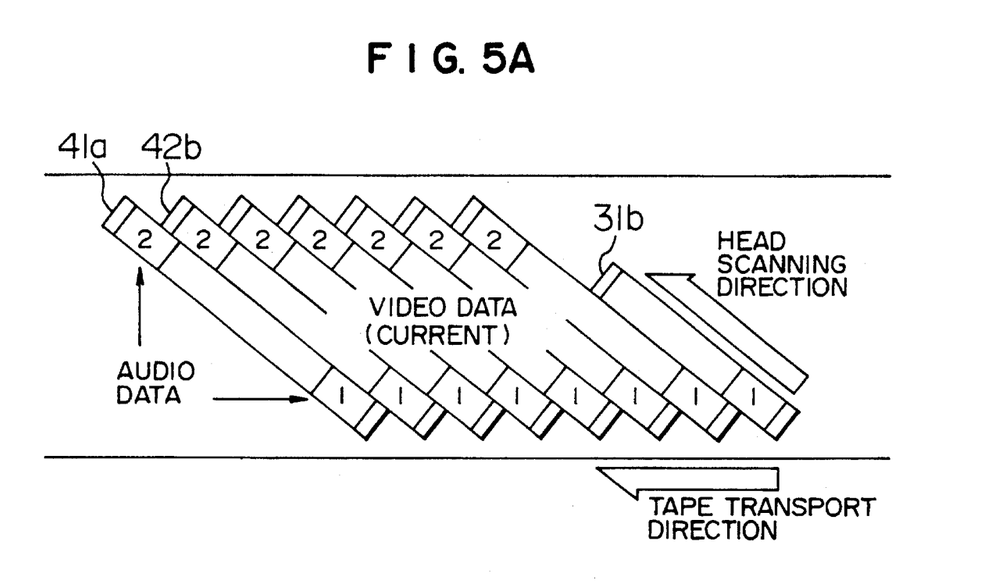
FIGS. 5A and 5B are track pattern diagrams for the current video data and the HD video data to show another embodiment of the digital magnetic recording method according to the present invention.
Figure 5B:
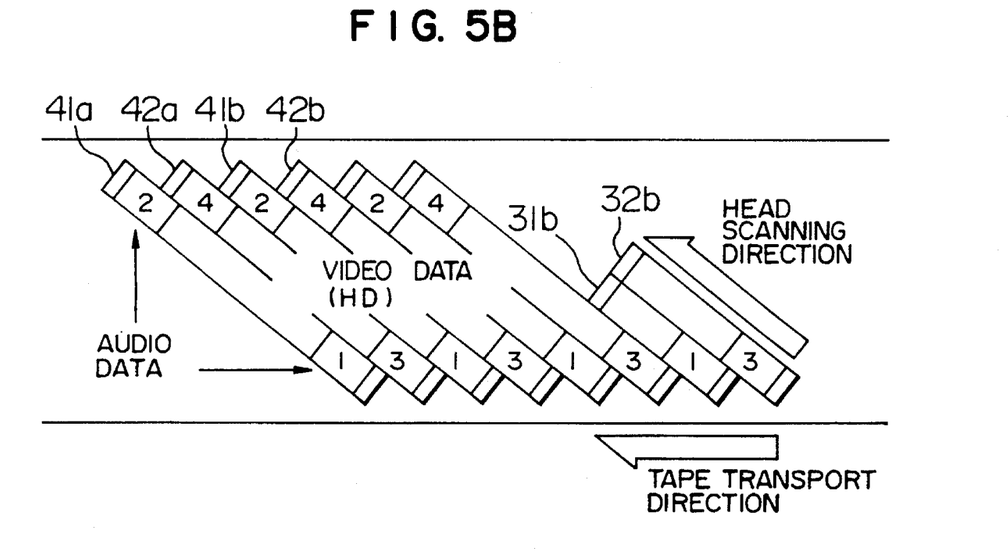

FIGS. 5A and 5B show track patterns of the current system and HDTV system video signals. Like in FIGS. 2A and 2B, FIGS. 5A and 5B show the track patterns in recording the current system and HDTV system video signals. When recording the current TV system video signal, as depicted in FIG. 5A, the video signal is recorded by azimuth recording on the tracks 41a and 42b by the magnetic heads 31a and 32b. As another embodiment of the recording areas of the video data and the audio data, the audio signals of two channels are recorded in the split areas across the video signal area. When recording the HDTV system video signal, as mentioned earlier, only the tape transportation speed of the magnetic tape 40 is made twice faster than in recording the current TV system video signal, and as illustrated in FIG. 5B, only the audio signals of the channels 1 and 2 are recorded on the track 41a, and the audio signals of channels 3 and 4 are recorded on the track 42a, but the recording areas of the video signal and the audio signal are common to those in recording the current TV video signal.

As has been described, in this embodiment, in recording and reproducing the current TV system and the HDTV system video signals, the common track patterns can be used by changing over the number of heads without changing the rotating speed of the rotary drum 30.

Figure 6:
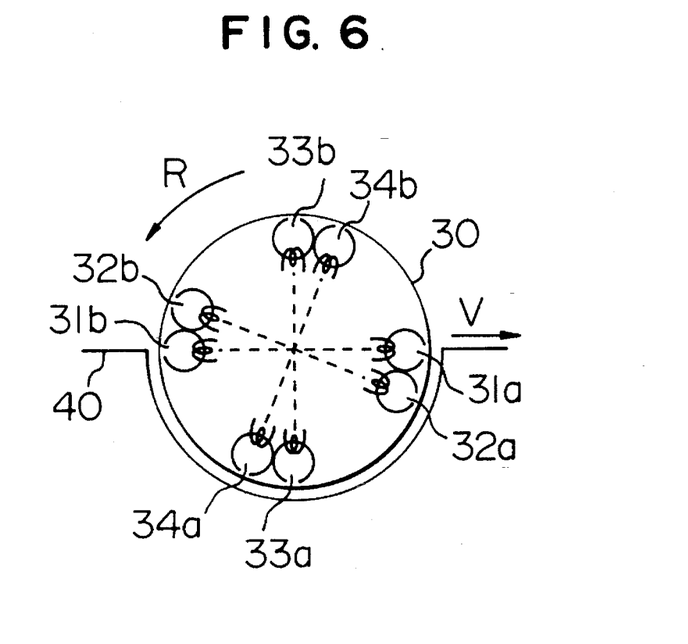
FIG. 6 is a head arrangement diagram in another embodiment of the digital magnetic recording and/or reproducing apparatus according to the present invention.

FIG. 6 presents the head arrangement in another embodiment of the digital magnetic recording and/or reproducing apparatus according to the present invention. In FIG. 6, the magnetic heads 33a, 34a and 33b, 34b are arranged in double azimuth head structure. In the case of the current TV system video signal, two-channel recording and reproduction is performed with the magnetic heads 31a, 32a, and 31b, 32b, while in the case of the HDTV system video signal, four-channel recording and reproduction is performed with the magnetic heads 31a, 32a; 33a, 34a; 31b, 32b; and 33b, 34b.

In this embodiment in FIG. 6, the magnetic heads used are twice as many as those in the embodiment shown in FIG. 4 both with the current TV system and the HDTV system, so that the rotating speed of the rotary drum 30 can be reduced to ½. To be more specific, if the rotating speed of the rotary drum 30 is 9000 rpm (the least common multiple of the drum speeds, which makes it possible to record and reproduce the current TV system video signals of both the 525-line/60-field system and the 625-line/50-field system at a common drum speed), the rotating speed of the rotary drum 30 in this embodiment shown in FIG. 6 can be reduced to 4500 rpm.

Figure 7A:
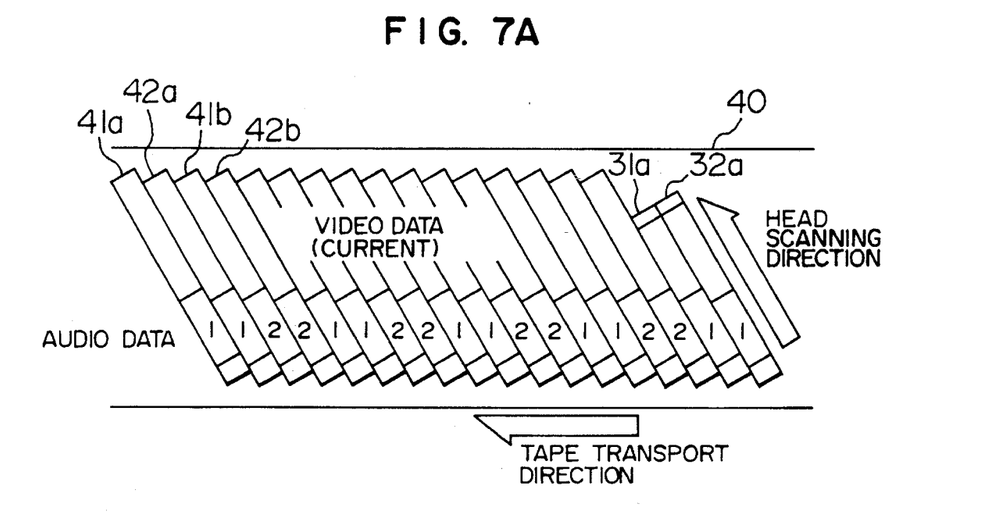
FIGS. 7A and 7B are track pattern diagrams for the current video data and the HD video data in another embodiment of the digital magnetic recording method according to the present invention, respectively.
Figure 7B:
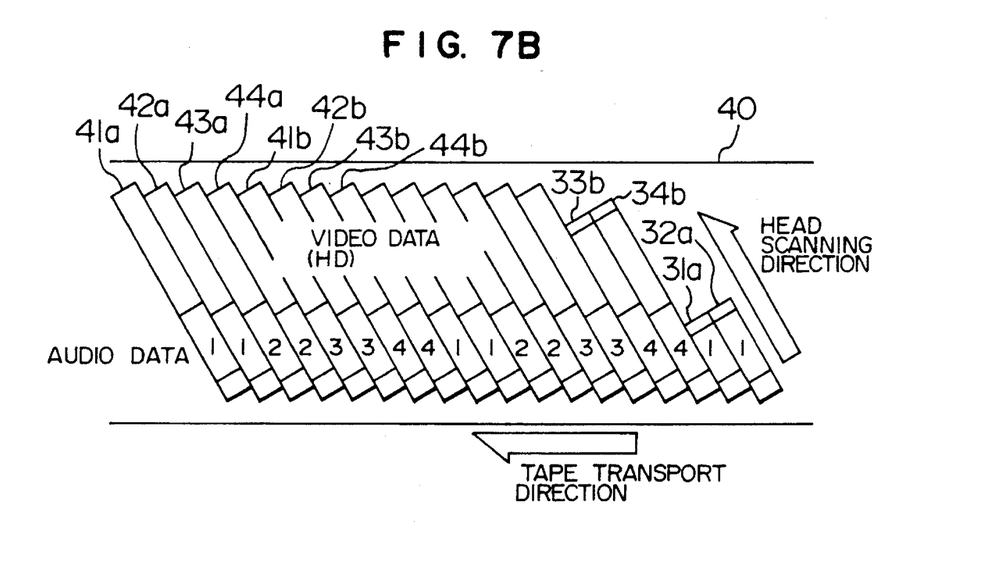

FIGS. 7A and 7B show as an example the track patterns of the current TV system and HDTV systems. Like in FIGS. 2A, 2B, and 5A and 5B, FIG. 7A depicts the track pattern of the current TV system and FIG. 7B depicts the track pattern of the HDTV system both in recording the video signal. When recording the current TV system video signal, as shown in FIG. 7A, the video signal is recorded by azimuth recording on the tracks 41a, 42a, and 41b, 42b with the magnetic heads 31a, 32a, and 31b, 32b. Here, as another embodiment of the recording areas of the video signal and the audio signal, the audio signals of two channels are recorded with the rotating periods of the rotating drum 30 on every two tracks successively. When recording the HDTV system video signal, as shown in FIG. 7B, the video signal is recorded by azimuth recording on the tracks 41a, 42a; 43a, 44a; 41b, 42b; and 43b, 43b with the magnetic heads 31a, 32a; 33a, 34a; 31b, 32b; and 33b, 34b, while the audio signals of four channels are recorded with the rotating periods of the rotary drum 30 on very two tracks successively.

As has been discussed above, also in this embodiment, a common track pattern can be used in recording and reproducing the current TV system and the HDTV system video signals. Moreover, the rotating speed of the rotary drum 30 can be reduced to ½ of the drum speed in the embodiment in FIG. 4.

The track patterns in FIGS. 7A and 7B are the patterns formed when the audio signal is recorded on every two tracks with one rotating period of the rotary drum 30. However, the audio signal may be recorded on a plurality of successive tracks with a frame period of the video signal. For example, if the rotating speed of the rotary drum 30 is 4500 rpm as mentioned above, in the case of the current TV system video signal of the 525-line/60-field system, since there are ten tracks in one frame, the audio signals of two channels are recorded or reproduced at a rate of five tracks for each channel, while in the case of the video signal of the 625-line/50-field system, since there are 12 tracks in one frame, the audio signal of each channel is recorded or reproduced on every six tracks. On the other hand, in the case of the HDTV system video signal, twice as many tracks per frame are used for the HD video signal and twice as many audio channels are used, so that the number of tracks per audio channel is the same as in the case of the current TV system video signal.

In the above-mentioned embodiment, the ratio of the numbers of audio channels between the current TV system and the HDTV system was 2:4, but this ratio may be 4:8, for example. In addition, as with the video signal, the audio signals may be recorded with bit-rate reduction. It is only necessary to set the number of audio channels at the same ratio as the ratio in the recording bit rate of the video signal.

As is understood from the foregoing description, according to the present invention, it is possible to use the common track format, including the recording areas for the video and audio signals in recording the current TV system and the HDTV system video signals, and this also realizes the common use and the simplification of the whole digital signal processing circuit, including the bit rate reduction and expansion circuit of the video signal.

Figure 8:
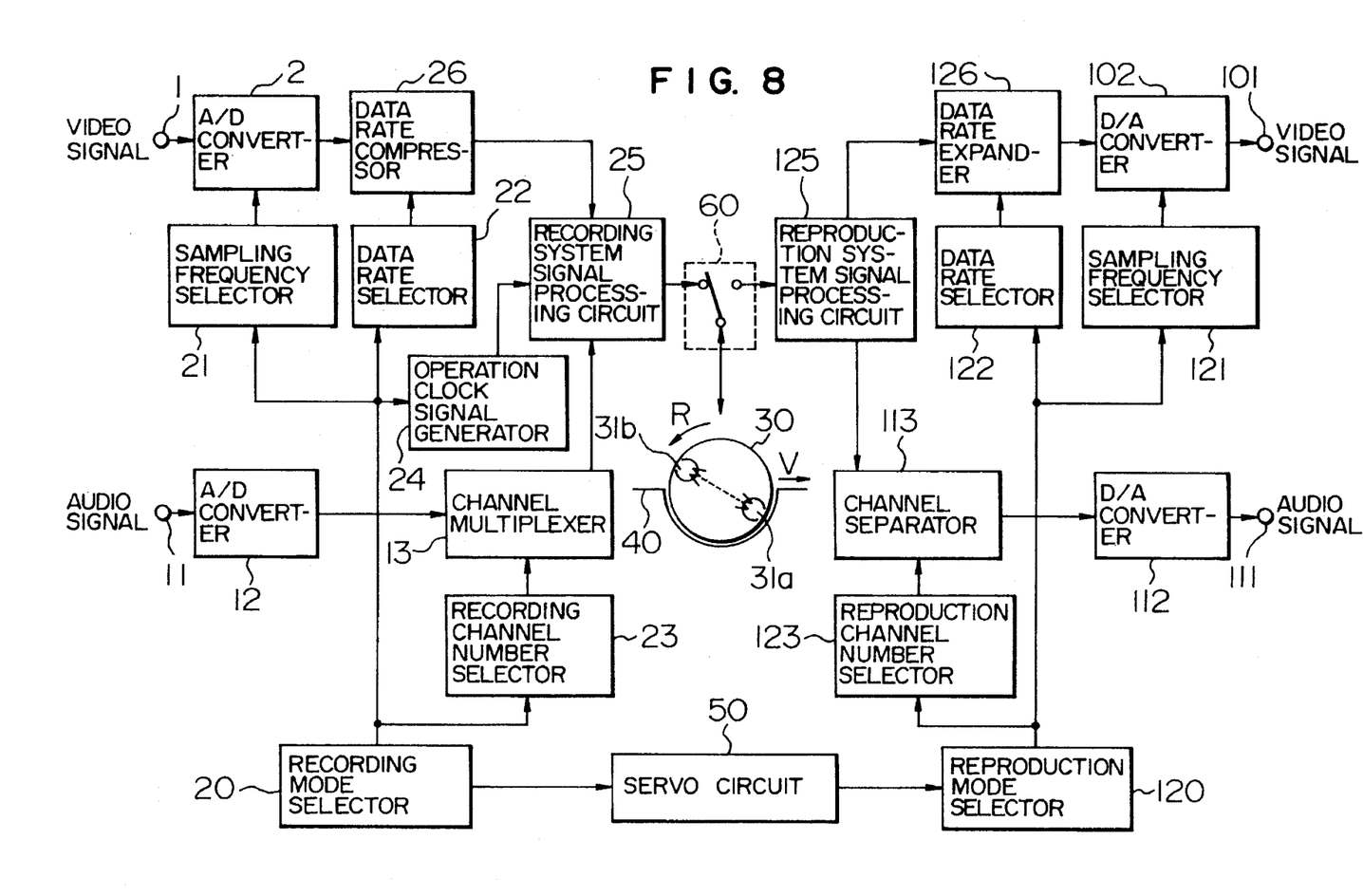
FIG. 8 is a block circuit diagram showing the general construction of the digital magnetic recording/reproducing apparatus according to an embodiment of the present invention.

FIG. 8 is a block diagram showing the digital magnetic recording/reproducing apparatus according to an embodiment of the present invention.

The same parts as in the structure of the recording apparatus in FIG. 1 and the reproducing apparatus in FIG. 3 are designated by the same reference numerals. The rotary drum 30 on which the recording/reproducing heads are mounted as in FIGS. 4 and 6 can be switched over to the recording system or the reproducing system by a recording/reproduction selector switch 60. The servo circuit 50, when recording is performed, receives a recording mode signal from the recording mode selector, and performs a prescribed operation, and when reproduction is executed, detects a reproduction mode signal from the recording tape, and supplies the reproduction mode signal to the reproduction mode selector 120. A data rate compressor 26 of the recording system includes a discrete cosine transformer 3, a scalar quantizer 4, a variable length coder 5, a buffer memory 6, and a data rate controller 7 for controlling the scalar quantizer 4 to reduce the amount of data in the buffer memory 6 after the bit rate reduction to less than a specified amount. A data rate expander 126 of the reproducing system includes the buffer memory 106, the variable length coder 105, the inverse scalar quantizer 104, the inverse discrete cosine transformer 103, and a data rate controller 107 for controlling the inverse scalar quantizer 104 to reduce the amount of data in the buffer memory 106 before the data rate expansion.

It will be understood that in the above-mentioned arrangement, by using adequate selector switches, the component elements of the recording and reproducing systems can be made commonly serviceable to the current TV system and the HDTV system signals.

What is claimed is:

1. A magnetic recording method for recording a first video signal digitized at a first sampling frequency and compressed to a first data rate or a second video signal digitized at a second sampling frequency and compressed to a second data rate n (where n is an integer of 2 or larger) times as large as said first data rate, comprising the steps of:

during recording of said first video signal, multiplexing digitized audio signals of m (where m is an integer of 2 or larger) channels and said first video signal together in a time division manner, resulting first multiplexed signals being output in sequence;

recording, while running a magnetic tape at a first transportation speed and rotating a rotary drum at a predetermined rotating speed, said first video signal and said audio signals of m channels multiplexed in a time division manner with k (where k is an integer) pairs of magnetic heads, each pair of said magnetic heads being mounted at 180° opposite positions on said rotary drum, and on k tracks in every one half revolution of said rotary drum; and during recording of said second video signal, multiplexing digitized audio signals of n×m channels and said second video signal together in a time division manner, resulting second multiplexed signals being output in sequence;

recording, while running said magnetic tape at a second transportation speed n times said first transportation speed and rotating said rotary drum at a same rotating speed as said predetermined rotating speed, said second video signal and said audio signals of n×m channels multiplexed in a time division manner with n×k pairs of magnetic heads, each pair of said magnetic heads being mounted at 180° opposite positions on said rotary drum, and on n×k tracks in every one half revolution of said rotary drum.

2. A magnetic recording method as claimed in claim 1, wherein n is 2.

3. A magnetic recording method as claimed in claim 2, wherein m is 2 or 4.

4. A magnetic recording method as claimed in claim 3, wherein k is 1 or 2.

5. A magnetic recording method for recording a first video signal digitized at a first sampling frequency and compressed to a first data rate or a second video signal digitized at a second sampling frequency and compressed to a second data rate n (where n is an integer of 2 or larger) times as large as said first data rate, comprising the steps of:

during recording of said first video signal, multiplexing digitized audio signals of m (where m is an integer of 2 or larger) channels and said first video signal together in a time division manner, resulting first multiplexed signals being output in sequence;

recording, while running a magnetic tape at a first transportation speed and rotating a rotary drum at a first rotating speed, said first video signal and said audio signals of m channels multiplexed in a time division manner with k (where k is an integer) pairs of magnetic heads, each pair of said magnetic heads being mounted at 180° opposite positions on said rotary drum, and on k tracks in every one half revolution of said rotary drum; and during recording of said second video signal, multiplexing digitized audio signals of n×m channels and said second video signal together in a time division manner, resulting second multiplexed signals being output in sequence;

recording, while running said magnetic tape at a second transportation speed n times said first transportation speed and rotating said rotary drum at a second rotating speed n times said first rotating speed, said second video signal and said audio signals of n×m channels multiplexed in a time division manner with k pairs of magnetic heads, each pair of said magnetic heads being mounted at 180° opposite positions on said rotary drum, and on k tracks in every one half revolution of said rotary drum.

6. A magnetic recording method as claimed in claim 5, wherein n is 2.

7. A magnetic recording method as claimed in claim 6, wherein m is 2 or 4.

8. A magnetic recording method as claimed in claim 7, wherein k is 1 or 2.

9. A magnetic recording apparatus for recording a first video signal having a specified band width or a second video signal having a wider band width than said first video signal together with audio signals, comprising:

a recording mode selecting means for selecting one of said first video signal and said second video signal as a signal to be recorded;

a first A/D converter for converting said first video signal into a digital signal at a first sampling frequency, or converting said second video signal into a digital signal at a second sampling frequency higher than said first sampling frequency;

a sampling frequency setting means for setting one of said first and second sampling frequency of said first A/D converter according to an output from said recording mode selecting means;

a data rate compressing means for compressing a digitized said first video signal from said first A/D converter to a first data rate, or compressing a digitized said second video signal from said first A/D converter to a second data rate n (where n is an integer of 2 or larger) times as large as said first data rate;

a data rate setting means for setting a data compression rate of said data rate compressing means according to an output from said recording mode selecting means;

a second A/D converter for converting said audio signals of m channels or n×m channels (where m is an integer of 2 or larger) into digital signals;

a channel multiplexer for multiplexing digitized said audio signals of m channels or n×m channels from said second A/D converter in a time division manner;

a recording channel number setting means for setting a number of multiplexing channels of said channel multiplexer according to an output from said recording mode selecting means;

a recording signal processing circuit, connected to an output of said data rate compressing means and said channel multiplexer, for respectively formatting a compressed said video signal and said audio signals of multiplexed channels, and multiplexing in a time division manner and modulating both said signals, resulting modulated signals being output in sequence;

a recording means, having at least n×k (where k is an integer) pairs of magnetic heads, each pair of said magnetic heads being mounted at 180° opposite positions on a rotary drum, for recording an output of said recording signal processing circuit of said first video signal with k pairs of magnetic heads on k tracks in every one half revolution of said rotary drum, or recording an output of said recording signal processing circuit of said second video signal with n×k pairs of magnetic heads on n×k tracks in every one half revolution of said rotary drum; and a servo circuit for running a magnetic tape having said first video signal recorded thereon at a first transportation speed, or running said magnetic tape having said second video signal recorded thereon at a second transportation speed n times said first transportation speed, while rotating said rotary drum at a fixed rotating speed, in response to an output of said recording mode selecting means.

10. A magnetic recording apparatus for recording a first video signal having a specified band width or a second video signal having a wider band width than said first video signal together with audio signals, comprising;

a recording mode selecting means for selecting one of said first video signal and said second video signal as a signal to be recorded;

a first A/D converter for converting said first video signal into a digital signal at a first sampling frequency, or converting said second video signal into a digital signal at a second sampling frequency higher than said first sampling frequency;

a sampling frequency setting means for setting one of said first and second sampling frequency of said first A/D converter according to an output from said recording mode selecting means;

a data rate compressing means for compressing a digitized said first video signal from said first A/D converter to a first data rate, or compressing a digitized said second video signal from said first A/D converter to a second data rate n (where n is an integer of 2 or larger) times as large as said first data rate;

a data rate setting means for setting a data compression rate of said data rate compressing means according to an output from said recording mode selecting means;

a second A/D converter for converting said audio signals of m channels or n×m channels (where m is an integer of 2 or larger) into digital signals;

a channel multiplexer for multiplexing digitized said audio signals of m channels or n×m channels from said second A/D converter in a time division manner;

a recording channel number setting means for setting a number of multiplexing channels of said channel multiplexer according to an output from said recording mode selecting means;

a recording signal processing circuit, connected to an output of said data rate compressing means and said channel multiplexer, for respectively formatting a compressed said video signal and said audio signals of multiplexed channels, and multiplexing in a time division manner and modulating both said signals, resulting modulated signals being output in sequence;

a recording means, having k (where k is an integer) pairs of magnetic heads, each pair of said magnetic heads being mounted at 180° opposite positions on a rotary drum, for recording an output of said recording signal processing circuit with k pairs of magnetic heads on k tracks in every one half revolution of said rotary drum; and a servo circuit for running a magnetic tape having said first video signal recorded thereon at a first transportation speed and rotating said rotary drum at a first rotating speed, or running said magnetic tape having said second video signal recorded thereon at a second transportation speed n times said first transportation speed and rotating said rotary drum at a second rotating speed n times said first rotating speed, in response to an output of said recording mode selecting means.

11. A magnetic reproducing apparatus for reproducing a first video signal having a specified band width or a second video signal having a wider band width than said first video signal together with audio signals, comprising:

a reproducing means, having at least n×k (where n is an integer of 2 or larger and k is an integer) pairs of magnetic heads, each pair of said magnetic heads being mounted at 180° opposite positions on a rotary drum, for reproducing with k pairs of magnetic heads said first video signal multiplexed with audio signals and recorded on k tracks in every one half revolution of said rotary drum, or reproducing with n×k pairs of magnetic heads said second video signal recorded on n×k tracks in every one half revolution of a said rotary drum, resulting reproduced signals being output in sequence;

a servo circuit for running a magnetic tape having said first video signal recorded thereon at a first transportation speed, or running said magnetic tape having said second video signal recorded thereon at a second transportation speed n times said first transportation speed, while rotating said rotary drum at a fixed rotating speed;

a reproducing mode setting means for receiving information as to said first or second transportation speed from said servo circuit, determining whether a signal reproduced from said magnetic tape is said first video signal or said second video signal, and setting a reproducing mode;

a reproduced signal processing circuit for demodulating a signal reproduced from said magnetic tape to separate a digital video signal from digital audio signals, and deformatting said signals;

a data rate expanding means for expanding said digital video signal separated and deformatted by said reproduced signal processing circuit, and outputting said digital video signal digitized at a sampling frequency in recording;

a data rate setting means for setting a data expansion rate of said data rate expanding means according to an output from said reproducing mode setting means;

a sampling frequency generating means for generating one of first and second sampling frequencies according to an output from said reproducing mode setting means;

a first D/A converter for generating an original video signal by converting said digital video signal into an analog video signal from said data rate expanding means at a sampling frequency from said sampling frequency generating means;

a channel separator for separating a multiplexed audio signal separated and deformatted by said reproduced signal processing circuit into audio signals of m channels or n×m channels (where m is an integer of 2 or larger);

a reproducing channel number setting means for setting m or n×m as audio channel number of said channel separator according to an output from said reproducing mode setting means; and a second D/A converter for reproducing original audio signals by converting said digital audio signals from said channel separator into analog audio signals.

12. A magnetic reproducing apparatus for reproducing a first video signal having a specified band width or a second video signal having a wider band width than said first video signal together with audio signals, comprising:

a reproducing means, having k (where k is an integer) pairs of magnetic heads, each pair of said magnetic heads being mounted at 180° opposite positions on a rotary drum, for reproducing with k pairs of magnetic heads said first video signal or said second video signal multiplexed with audio signals and recorded on k tracks in every one half revolution of said rotary drum, resulting reproduced signals being output in sequence;

a servo circuit for running a magnetic tape having said first video signal recorded thereon at a first transportation speed and rotating said rotary drum at a first rotating speed, or running said magnetic tape having said second video signal recorded thereon at a second transportation speed n (where n is an integer of 2 or larger) times said first transportation speed and rotating said rotary drum at a second rotating speed n times said first rotating speed;

a reproducing mode setting means for receiving information as to said first or second transportation speed and said first or second rotating speed from said servo circuit, determining whether a signal reproduced from said magnetic tape is said first video signal or said second video signal, and setting a reproducing mode;

a reproduced signal processing circuit for demodulating a signal reproduced from said magnetic tape to separate a digital video signal from digital audio signals, and deformatting said signals;

a data rate expanding means for expanding said digital video signal separated and deformatted by said reproduced signal processing circuit, and outputting said digital video signal digitized at a sampling frequency in recording;

a data rate setting means for setting a data expansion rate of said data rate expanding means according to an output from said reproducing mode setting means;

a sampling frequency generating means for generating one of first and second sampling frequencies according to an output from said reproducing mode setting means;

a first D/A converter for generating an original video signal by converting said digital video signal into an analog video signal from said data rate expanding means at a sampling frequency from said sampling frequency generating means;

a channel separator for separating a multiplexed audio signal separated and deformatted by said reproduced signal processing circuit into audio signals of m channels or n×m channels (where m is an integer of 2 or larger);

a reproducing channel number setting means for setting m or n×m as an output audio channel number of said channel separator according to an output from said reproducing mode setting means; and a second D/A converter for reproducing original audio signals by converting said digital audio signals from said channel separator into analog audio signals.

13. A magnetic recording/reproducing apparatus for recording/reproducing a first video signal having a specified band width or a second video signal having a wider band width than said first video signal together with audio signals, comprising:

a recording system, including:

a recording mode setter for setting a recording mode of said first or second video signal, depending on which video signal is to be recorded;

a first A/D converter for converting said video signal into a digital video signal;

a second A/D converter for converting said audio signals of multiple channels into digital audio signals;

a data rate compressor for compressing said video signal digitized by said first A/D converter to a specified data rate, a ratio of a specified data rate of said first video signal after compression to a data rate of said second video signal after compression being 1:n (where n is an integer of 2 or larger);

a recording rate setting circuit for supplying said first A/D converter and said data rate compressor, respectively, with a sampling frequency and a data rate for data rate compression according to an output from said recording mode setter;

a channel multiplexer for multiplexing said audio signals of multiple channels digitized by said second A/D converter in a time division manner by a number of channels according to an output from said recording mode setter;

a recording signal processing circuit for formatting an output of said data rate compressor and an output of said channel multiplexer, then multiplexing in a time division manner and modulating said two items of data, resulting modulated signals being output in sequence;

a recording means, having at least n×k (where k is an integer) pairs of magnetic heads, each pair of said magnetic heads being mounted at 180° opposite positions on a rotary drum, for recording an output of said recording signal processing circuit with k pairs of magnetic heads on k tracks in every one half revolution of said rotary drum in a first video signal recording mode, or recording an output of said recording signal processing circuit with n×k pairs of magnetic heads on n×k tracks in every one half revolution of said rotary drum in a second video signal recording mode; and a servo circuit for running a magnetic tape at a first transportation speed in said first video signal recording mode, or running said magnetic tape at a second transportation speed n times said first transportation speed in said second video signal recording mode, in response to an output of said recording mode setter, and a reproducing system, including:

said servo circuit for running said magnetic tape at a same transportation speed as in recording according to said first or second video signal recording mode;

a reproducing mode setter for setting a reproducing mode corresponding to said first or second video signal recording mode by determining whether a signal reproduced from said magnetic tape is said first or second video signal from information from said servo circuit;

a reproducing means for changing over said recording means to a reproducing mode, and reproducing a signal recorded in said first video signal recording mode with k pairs of magnetic heads, or reproducing a signal recorded in said second video signal recording mode with n×k pairs of magnetic heads, resulting reproduced signals being output in sequence;

a reproduced signal processing circuit for demodulating signals reproduced from said magnetic tape to separate said signals into a digital video signal and digital audio signals, and deformatting said signals;

a data rate expander for expanding a deformatted said digital video signal from said reproduced signal processing circuit at a given data rate;

a first D/A converter for generating an original video signal by converting a digital output of said data rate expander into an analog video signal at a given sampling frequency;

a setting circuit for supplying said data rate expander and said first D/A converter with a data rate for bit rate expansion and a sampling frequency in response to an output from said reproducing mode setter;

a separating circuit for separating a multiplexed signal deformatted by said reproduced signal processing circuit into audio signals of a number of channels corresponding to an output of said reproducing mode setter; and a second D/A converter for reproducing original audio signals by converting digital audio signals from said separating circuit into analog audio signals.

14. A magnetic recording/reproducing apparatus for recording/reproducing a first video signal having a specified band width or a second video signal having a wider band width than said first video signal together with audio signals, comprising:

a recording system, including:

a recording mode setter for setting a recording mode of said first or second video signal, depending on which video signal is to be recorded;

a first A/D converter for converting said video signal into a digital video signal;

a second A/D converter for converting said audio signals of multiple channels into digital audio signals;

a data rate compressor for compressing said video signal digitized by said first A/D converter to a specified data rate, a ratio of a specified data rate of said first video signal after compression to a data rate of said second video signal after compression being 1:n (where n is an integer of 2 or larger);

a recording rate setting circuit for supplying said first A/D converter and said data rate compressor, respectively, with a sampling frequency and a data rate for data rate compression according to an output from said recording mode setter;

a channel multiplexer for multiplexing said audio signals of multiple channels digitized by said second A/D converter in a time division manner by a number of channels according to an output from said recording mode setter;

a recording signal processing circuit for formatting an output of said data rate compressor and an output of said channel multiplexer, then multiplexing in a time division manner and modulating said two items of data, resulting modulated signals being output in sequence;

a recording means, having k (where k is an integer) pairs of magnetic heads, each pair of said magnetic heads being mounted at 180° opposite positions on a rotary drum, for recording an output of said recording signal processing circuit with k pairs of magnetic heads on k tracks in every one half revolution of said rotary drum in a first or second video signal recording mode; and a servo circuit for running a magnetic tape at a first transportation speed and rotating said rotary drum at a first rotating speed in said first video signal recording mode, or running said magnetic tape at a second transportation speed n times said first transportation speed and rotating said rotary drum at a second rotating speed n times said first rotating speed in said second video signal recording mode, in response to an output of said recording mode setter, and a reproducing system, including:

said servo circuit for running said magnetic tape at a same transportation speed and rotating said rotary drum at a same rotating speed as in recording according to said first or second video signal recording mode;

a reproducing mode setter for setting a reproducing mode corresponding to said first or second video signal recording mode by determining whether a signal reproduced from said magnetic tape is said first or second video signal from information from said servo circuit;

a reproducing means for changing over said recording means to a reproducing mode, and reproducing a signal recorded in said first video signal recording mode, or reproducing a signal recorded in said second video signal recording mode, with k pairs of magnetic heads, resulting reproduced signals being output in sequence;

a reproduced signal processing circuit for demodulating signals reproduced from said magnetic tape to separate said signals into a digital video signal and digital audio signals, and deformatting said signals;

a data rate expander for expanding a deformatted said digital video signal from said reproduced signal processing circuit at a given data rate;

a first D/A converter for generating an original video signal by converting a digital output of said data rate expander into an analog video signal at a given sampling frequency;

a setting circuit for supplying said data rate expander and said first D/A converter with a data rate for bit rate expansion and a sampling frequency in response to an output from said reproducing mode setter;

a separating circuit for separating a multiplexed signal deformatted by said reproduced signal processing circuit into audio signals of a number of channels corresponding to an output of said reproducing mode setter; and a second D/A converter for reproducing original audio signals by converting digital audio signals from said separating circuit into analog audio signals.

* * * * *